United States Patent [19]

Ibsen et al.

[11] Patent Number: 5,847,020

[45] Date of Patent: Dec. 8, 1998

[54] DENTAL ADHESIVE COMPRISING A HOMOGENEOUS MIXTURE OF AN UNSATURATED MONOMER A COUPLING AGENT A CROSSLINKING AGENT AND A PHOTOINITIATOR

[75] Inventors: Robert L. Ibsen, Santa Maria; William R. Glace, Orcutt, both of Calif.

[73] Assignee: Den-Mat Corporation, Santa Maria, Calif.

[21] Appl. No.: 870,540

[22] Filed: Jun. 6, 1997

Related U.S. Application Data

[63] Continuation of Ser. No. 515,185, Aug. 11, 1995, abandoned.

[51] Int. Cl.⁶ .................................................. C08K 3/28
[52] U.S. Cl. ........................... 522/84; 522/48; 522/79; 522/182; 522/30; 523/118
[58] Field of Search ..................... 522/48, 79, 182, 522/84, 30; 523/118

[56] References Cited

U.S. PATENT DOCUMENTS

| Re. 34,937 | 5/1995 | Ibsen et al. | 106/35 |
|---|---|---|---|
| 4,738,722 | 4/1988 | Ibsen et al. | 106/35 |
| 4,964,911 | 10/1990 | Ibsen et al. | 106/35 |
| 5,151,453 | 9/1992 | Ibsen et al. | 522/14 |
| 5,270,351 | 12/1993 | Bowen | 523/116 |
| 5,320,886 | 6/1994 | Bowen | 525/42 |
| 5,334,625 | 8/1994 | Ibsen et al. | 523/115 |
| 5,401,783 | 3/1995 | Bowen | 523/116 |

*Primary Examiner*—Maria Nuzzolillo
*Assistant Examiner*—Laura Werner
*Attorney, Agent, or Firm*—Dorsey & Whitney LLP

[57] ABSTRACT

A single package adhesive for tooth bonding application comprising a solvent-based homogeneous mixture of a) an ethylenically unsaturated functional and hygroscopically functional monomer;

b) an ethylenically unsaturated functional and hygroscopically functional coupling agent that is capable of (a) chemically reacting with and through the ethylenic bond of the ethylenically unsaturated functional monomer of 1) above and (b) chemically bonding to the surface to which the adhesive is applied;

c) a poly-ethylenically unsaturated functional crosslinking agent that is capable of reacting with the monomer of 1) above and the coupling agent of 2) above; and d) a photoinitiator that induces addition polymerization of an ethylenically unsaturated compound.

A method for forming a composite and composite structure are included that emply the single package adhesive.

14 Claims, No Drawings

DENTAL ADHESIVE COMPRISING A HOMOGENEOUS MIXTURE OF AN UNSATURATED MONOMER A COUPLING AGENT A CROSSLINKING AGENT AND A PHOTOINITIATOR

This application is a continuation of application Ser. No. 08/515,185 filed Aug. 11, 1995 which application is now abandoned.

BRIEF DESCRIPTION OF THE INVENTION

A single package adhesive for tooth bonding application comprising a solvent-based homogeneous mixture of:

1) an ethylenically unsaturated functional and hygroscopically functional monomer;
2) an ethylenically unsaturated functional and hygroscopically functional coupling agent;
3) a poly-ethylenically unsaturated functional crosslinker (cross linking agent); and
4) a photoinitiator.

Composite formation by adhesively interbonding with tooth components using this single package adhesive.

BACKGROUND TO THE INVENTION

Geristore™ and Tenure™, sold by Den-Mat Corporation, Santa Maria, Calif., are promoted for certain uses in dentistry. U.S. Pat. Nos. 4,738,722, 5,334,625 and 5,151,453, incorporated herein by reference, describe Geristore™. Geristore™ is a small particle composite that contains fluoride, is radiopaque and hydrophilic. It has low-cure shrinkage, low coefficient of thermal expansion and high strength. It aggressively bonds by chemical coupling to dentin, enamel, composites used in dentistry, porcelain and metal, such as stainless steel. It is a paste/paste formulation that is easy to mix. It is capable of rapid cure by exposure to room temperature and for more rapid cure, by exposure to light. In addition, though it contains a fluoride, which could be toxic when ingested in large dosages, it is biocompatible and safe to use within a human or other animal when applied topically.

Tenure™ is a solvent-based crosslinkable acrylic resin, provided as a solution/solution formulation, that is, a two package system. Its composition is described in U.S. Pat. No. 4,964,911, patented Oct. 27, 1990, and more effectively disclosed in U.S. Pat. No. Re. 34,937, patented May 16, 1995, the disclosure of which is incorporated by reference. It is not an ionomer and does not release fluoride ion. It is less hydrophilic than Geristore™. It, too, is a crosslinkable resin. It contains a volatile solvent (typically acetone), which readily evaporates. After evaporation, a film of the resin rapidly cures in situ. The film is light and/or heat cured to a thermoset condition. Tenure™ bonds by chemical coupling to dentin, enamel, porcelain, metal and the composites typically used in dentistry. It has been recommended for use with Geristore™ in chemically bonding Geristore™ to dentin or enamel.

Bisco Inc., 1500 W. Thordal Ave., Itasca, Ill., 60143, sells a "one-step" adhesive bonding acrylic resin system called "Uni-Bond" that uses a single solution to form the adhesive resin film. It is cited by the seller to yield the following physical data in bonding to certain substrates:

| Substrates | SBS, MPa |
|---|---|
| Dentin (using etchant) | 27.3 (0.6) |
| Enamel (using etchant) | 30.4 (3.8) |
| Metals: | |
| Gold Alloy | 20.6 (5.0) |
| Rexillium III (Ni—Cr) | 25.5 (2.3) |
| Stainless Steel (316) | 29.2 (1.7) |
| Set Amalgam (Tytin ®) | 13.6 (1.5) |

There is a need for an adhesive composition with the properties of Tenure® that is designed to be used from a single package of ingredients.

THE INVENTION

This invention relates to a single package adhesive for tooth bonding application comprising a solvent-based homogeneous mixture of:

1) An ethylenically unsaturated functional and hygroscopically functional monomer. In other words, this monomer contains ethylenic unsaturation such that it coreacts by addition polymerization with the coupling agent, infra, and the crosslinking agent, infra. In addition, this monomer possesses a hygroscopic group that contributes to the properties of the adhesive.

2) An ethylenically unsaturated functional and hygroscopically functional coupling agent. This coupling agent is capable of (a) chemically reacting with and through the ethylenic bond of the ethylenically unsaturated-functional monomer of 1) above and (b) chemically bonding to the surface to which the adhesive is applied. For example, the coupling agent may be an acrylic-type monomer that possesses acrylic-type unsaturation and contains a surface bonding group, such as, one or more of the following groups:

| i) an alkylene polyether; | vii) phosphinyl |
|---|---|
| ii) hydroxyl | viii) stannoyl |
| iii) carboxylic acid salt | ix) amide |
| iv) quaternary ammonium | x) alkylene amine |
| v) tertiary amine | xi) alkoxysilyl |
| vi) phosphoryl | xii) acyloxysilyl |

3) A poly-ethylenically unsaturated functional crosslinker (cross linking agent) that is capable of reacting with the monomer of 1) above and the coupling agent of 2) above. In other words, the crosslinker (cross linking agent) is a polyfunctional molecule where the functionality is complementary to the ethylenic unsaturation of the ethylenically unsaturated functional monomer of 1) above and the coupling agent of 2) above.

4) a photoinitiator, i.e., a free radical photoinitiator that induces addition polymerization of an ethylenically unsaturated compound.

It was not predictable, and hence was unexpected, that the above solution, particularly as described herein, could be used as a replacement for the multipackage adhesive of U.S. Pat. No. Re. 34,937. The single solution adhesive of this invention yields adhesive properties competitive with the multipackaged adhesives described in U.S. Pat. No. Re. 34,937.

In characterizing the invention, reference is made to the fact that the adhesive is employed in tooth bonding. The term tooth bonding is intended to mean all of the various bonding applications used in the care, correction, restoration and/or repair of teeth and other oral surfaces, including bonding of and/or between enamel, dentin, bone, gum, porcelain, metal (gold, titanium, and the like), amalgam, plastic (e.g., the acrylics), and the like.

An important facet of this invention is that the components of the formulation are sufficiently compatible with each other and the solvent of choice. This means that the combination of the ingredients used in making the invention form a stable homogeneous mixture, i. e., they form a stable solution that can be stored for an extended period of time. It is preferred in the practice of the invention that all of the components of the formulation remain in solution at ambient conditions for months, without precipitation of any component. However, it is within the contemplation of this invention that one or more of the ingredients of the formulation may precipitate from the solution on standing. In those instances, the precipitate is a soft deposit that is readily redissolved by stirring.

The solvent may be an aqueous-containing organic solvent. In addition, the invention relates to composite formation by adhesively interbonding with tooth components.

The inventive adhesive comprises a resin based on an ethylenically unsaturated-functional monomer that contains a hygroscopic group and exhibits hydrophilicity. Typical of such groups are hydroxyl, amide, amine, aliphatic ether, amine, hydroxyalkyl amine, hydroxyalkyl amide, pyrrolidone, ureyl, and the like.

Another feature of the inventive adhesive is that it tenaciously bonds to surfaces onto which it is coated as well as securely tie up any inorganic filler that is included in its formulation. This is accomplished by the presence of a coupling agent in the adhesive formulation of the invention. The coupling agent provides chemical bonding to the surface to which the adhesive is applied. Chemical bonding means strong and weak bonding forces. Strong bonding forces, as used herein, refers to covalent, ionic, hydrogen bonding and complexation, and weak bonding forces, encompasses the other forms of bonding. Where weak bonding forces are employed, the extent of such bonding is such that the adhesion to the surface is of the nature of a stronger bonding force. For example, van der Waal forces are weak bonding forces. In the case of the invention, the amount of such forces existing between the adhesive and the surface will be sufficient to give the performance of a stronger bonding force.

A desirable coupling agent is a compound, such as monomer, adduct or polymer, that is functionally complementary to the ethylenically unsaturated functional monomer. Desirably, the coupling agent contains a functional group that is complementary with the ethylenic unsaturation of the ethylenically unsaturated functional monomer. Preferably, the functional group is an acrylic-type ethylenic unsaturation. At another part of the coupling agent molecule is a surface bonding group that can impart one or more properties to the adhesive coating:

1) chemical bonding capabilities to the substrate surface to which the adhesive coating is applied; and/or
2) wetting agent properties, that is, reduce the surface tension of the adhesive coating, causing the coating to spread across or penetrate more easily the substrate surface onto which the adhesive coating is applied.

In addition, the adhesive of the invention contains at least one crosslinking agent. The crosslinking agent is a polyfunctional molecule where the functionality is complementary to the ethylenic unsaturation of the ethylenically unsaturated functional monomer and the functional group of the coupling agent. In one aspect, the functional groups of the crosslinking agent are bonded via aliphatic groups, each of up to 10 carbon atoms, to a central organic moiety that is aromatic in nature, that is, comprises a group that has the rigidity characteristics of a benzene ring. Illustrative of such rigid groups are aromatic rings such as benzene, biphenyl, anthracyl, benzophenone, norbornyl, and the like. Such crosslinkers raise the $T_g$ of the cured coating. In the case of such crosslinkers, it is desirable that they contain carboxylic acid alkali metal (Li, Na, K, Rb or Cs) salt groups directly bonded to a carbon atom of the rigid ring. Such salt forms enhance the solubility of the crosslinker in the solvent. Preferably, in another aspect, the functional groups of the crosslinking agent are bonded to a central moiety that is aliphatic in nature, that is, comprises a group that has the flexibility of an alkane or an alkyl benzene containing compound. Illustrative of such flexible groups are the residues of ethylene glycol, diethylene glycol, 2,2-bis(4-hydroxyphenyl)propane, 2,2,-bis(4-hydroxyphenyl) fluoroalkanes, and the like. Such softer crosslinkers toughen the cured coating and can raise the $T_g$ of the cured coating, but not as high as the other more rigid crosslinking agents. Mixtures of such crosslinking agents can be employed in the practice of the invention. For example, mixtures of such crosslinking agents where one is employed in amount by weight greater than the other are within the contemplation of this invention, as is a mixture of equal amounts by weight of the different crosslinking agents. In the case of such mixtures, one of the crosslinking agents may be used in amount of from about 1 weight percent of the weight of the crosslinking agent component of the adhesive formulation of the invention to about 99 weight percent of the weight of the crosslinking agent component of the adhesive formulation of the invention.

In order to cure the adhesive of the invention, its formulation is provided with a conventional free-radical photoinitiator. The invention also contemplates, as an optional feature, the use of free radical scavengers in the formulation.

A primary advantage of the invention is that the adhesive composition is a homogeneous liquid single-package system. This means that the adhesive composition is a solution that can be stored in and used from a single container, such as a metal, glass or plastic container. Quite surprisingly, the adhesive of the invention yields adhesive performance similar to the Tenure® multi-package system adhesive, described in U.S. Pat. No. Re. 34,937.

In particular, the invention relates to the improvement where the adhesive composition is a homogeneous liquid single-package system comprising:

1) an ethylenically unsaturated functional monomer, such as 2-hydroxyethyl-methacrylate, 2,3-dihydoxypropylmethacrylate, and the like;
2) a coupling agent, such as one or more of the alkali metal salt of (i) N-phenylglycine, (ii) the adduct of N-(p-tolyl)glycine and glycidyl methacrylate, and (iii) the adduct of N-phenylglycine and glycidyl methacrylate;
3) a crosslinker (cross linking agent) such as 2,2-bis(4-methacryloxy 2-ethoxy-phenyl) propane, diethyleneglycol bismethacrylate, the alkali metal salts of 4,4'-bis (4-methacryloxy-2-ethoxy 3-carboxy)biphenyl (salt of the reaction product of 2-hydroxyethylmethacrylate and sym.-tetracarboxylic dianhydride), the alkali metal salts of the reaction product of 2-hydroxyethylmethacrylate and pyromellitic anhydride, the alkali metal salt of the reaction product of 2-hydroxyethylmethacrylate and 3,3',4,4'-bensophenonetetracarboxylic anhydride, the alkali metal salt of the reaction product of 2-hydroxyethylnethacrylate and trimellitic anhydride, and the like, in which the alkali metals are one or more of Li, Na, K, Rb and Cs;
4) a photoinitiator;
5) a water soluble organic solvent such as acetone; and
6) water.

In the preferred embodiment of the invention, the adhesive formulation is a solution comprising:
a) 2-Hydroxyethylmethacrylate
b) The alkali metal salt of the adduct of N-(p-tolyl)glycine and glycidyl methacrylate; e.g., the structure:

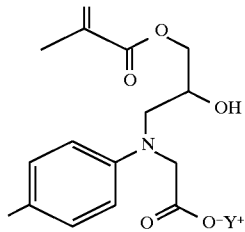

where Y is an alkali metal such as Li, Na, K, Rb and Cs. Preferably, Y is sodium or potassium.
c) Ethoxylated bisphenol A dimethacrylate, i. e., 2,2-bis (4-methacryloxy 2-ethoxy-phenyl) propane; and
d) A photoinitiator such as ethyl 4-dimethylamino benzoate and camphoquinone (i.e., 2,3-bornanedione);
e) acetone-water solvent mixture, most desirably in about a 4/1 weight ratio.

The adhesive composition of the invention is used to form a composite structure, and involves, in one preferred embodiment, the steps of:
(a) Optionally, contacting the adherend surface with an aqueous etching or conditioning solution comprising at least one strong acid or acidic salt in order to condition the surface, followed by rinsing and drying the surface.
(b) coat the surface with a solution comprising:
1) an ethylenically unsaturated functional monomer;
2) a coupling agent;
3) a crosslinker (cross linking agent);
4) a photoinitiator;
(c) cure the coating with light;
(d) apply a compositing material to the coating; and
(e) cure the compositing material in contact with the coating.

The composite comprising the cured single package adhesive described above bonded to another surface, such as a portion of a tooth and/or a prosthetic device. The portion may be dentin, enamel or any traditional device material such as metal (titanium, gold, stainless steel, amalgam and the like), porcelain, acrylic plastic, and the like.

DETAIL DESCRIPTION OF THE INVENTION

The adhesive coating based on the adhesive formulation of the invention is typically a crosslinked light set resin that contains hygroscopic groups that attract water to the coating. When the crosslinking is not too extensive, the adhesive coating can absorb enough water to cause it to swell. The amount of water that the adhesive coating can absorb can be as high as 25 weight percent. However, the degree of crosslinking of the adhesive coating is typically high enough that water absorption will not exceed about 5 weight percent.

The backbone of the polymer providing the hygroscopic groups of the resin phase of the adhesive coating is typically aliphatic and may contain groups therein that enhance the hydrophilicity of the resin phase. The adhesive coating's resin is typically the in situ reaction product of one or more of a polymerizable ethylenically unsaturated organic monomer containing groups that are attractive to water. Thus the components of the adhesive formulation may be:

(a) an ethylenically unsaturated functional monomer that contains a hygroscopic group. Typical of such groups are hydroxyl, amide, amine, aliphatic ether, amine, hydroxyalkyl amine, hydroxyalkyl amide, pyrrolidone, ureyl, and the like. Illustrative of such monomers are the following:

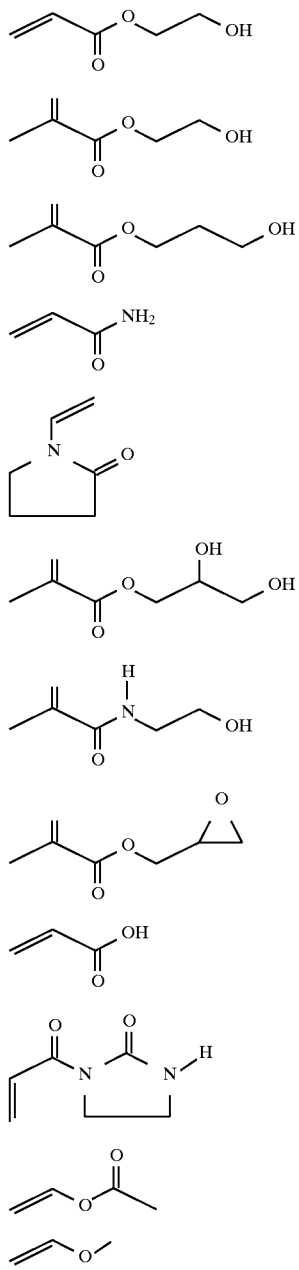

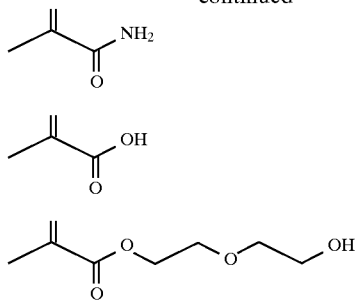

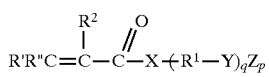

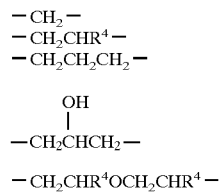

A particularly desirable ethylenically unsaturated-functional monomer is an acrylic-type monomer having the following structure:

$$R'R''C=C(R^2)-C(=O)-X-(R^1-Y)_q-Z_p$$

wherein R' and R", individually, are hydrogen, alkyl of 1 to about 4 carbon atoms, monocyclic aryl, such as phenyl, alkyl phenyl where the alkyl is 1 to about 3 carbon atoms, cyclohexyl, and the like; $R^2$ is hydrogen, alkyl of 1 to about 3 carbon atoms, and the like; X is O,S and N—$R^3$, where R3 is hydrogen, alkyl of 1 to about 4 carbon atoms, —$R^1$—Y, and the like; $R^1$ is a divalent radical connecting Y to X, and may be one of the following:

—CH$_2$—
—CH$_2$CHR$^4$—
—CH$_2$CH$_2$CH$_2$—

—CH$_2$CH(OH)CH$_2$—

—CH$_2$CHR$^4$OCH$_2$CHR$^4$— wherein each $R^4$ is hydrogen or alkyl of 1 to about 3 carbon atoms; and Y is OH, NR$^5$, SH, OR$^6$, where $R^5$ is hydrogen, methylol, methylol methyl ether, $R^6$ is alkyl of 1 to about 3 carbon atoms provided that $R^1$ is —CH$_2$—, and the like; q is 0 or 1 and p is 0 or 1, and p is 0 when q is 1 and 1 when q is 0; and Z is hydrogen.

A particularly desirable thermosetting adhesive coating is based on 2-hydroxyethyl methylmethacrylate ("HEMA"), 2-hydroxyethyl acrylate, 2,3-dihydroxypropyl methacrylate, acrylamide, methacrylamide, hydroxyalkyl acrylamide, hydroxyalkyl methacrylamide, and the like materials co-reacted with the coupling agent and the crosslinking agent.

(b) A desirable coupling agent is an acrylic-type monomer that possesses acrylic-type unsaturation and contains a surface bonding group possessing one or more of the following groups:

| | |
|---|---|
| 1) an alkylene polyether; | 7) phosphinyl |
| 2) hydroxyl | 8) stannoyl |
| 3) carboxylic acid salt | 9) amide |
| 4) quaternary ammonium | 10) alkylene amine |
| 5) tertiary amine | 11) alkoxysilyl |
| 6) phosphoryl | 12) acyloxysilyl |

A preferred coupling agent is a simple aromatic substituted amino acid alkali metal salt such as the alkali metal salt of (i) N-phenylglycine, (ii) the adduct of N-(p-tolyl)glycine and glycidyl methacrylate, which is illustrated by the structure:

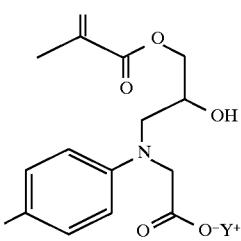

where Y is one of the alkali metals, i.e., lithium, sodium, potassium, rubidium and cesium, preferably sodium or potassium, and (iii) the adduct of N-phenylglycine and glycidyl methacrylate, which is illustrated by the structure:

where Y is described above; or the mixture of the preceding two compounds, alone or in combination with a compound containing at least one group or moiety capable of free radical polymerization and at least one aromatic ring or moiety containing one or more electron-withdrawing carboxylic acid alkali metal salt substituents that do not interfere with free radical polymerization.

Additional examples of coupling agents are the alkali metal salts of a carboxylic acid containing at least one amino group. This includes the alkali metal salts or esters of the amino acids in general, such as N-phenylglycine, N-(p-tolyl) glycine, N-phenylalanine, sarkosine, N-lauroylsarkosine, glycine, N,N-dimethylglycine, 3-(N-phenyl)aminopropionic acid, 3-(N-p-tolyl) amino propionic acid, omega-amino fatty acids, N-substituted-omega-amino fatty acids, the addition reaction product of N-phenyl glycine and glycidyl reagents, and the reaction product of N-(substituted phenyl) glycine and glycidyl reagents. It is anticipated that the alkali-metal salts of many or all of these compounds would be effective to one degree or another.

These coupling agents interreact with the polymerization of the aforementioned ethylenically unsaturated-functional monomer that contains a hygroscopic group, and enhance wetting and bonding by the resulting resin of proteinaceous surfaces by surface interaction with the carboxylic acid salt group of the coupling agent.

(c) A number of acrylic coating resins rely on polyacrylyl substituted monomers to crosslink and chain extend the polymer that comes into existence on polymerization in the presence of an polymerization initiator. For example, the pure forms of HEMA typically contain small amounts of ethylene glycol dimethacrylate which will crosslink a polymer based on HEMA. The degree of crosslink may be so minuscule as to have little effect on the ultimate properties of the polymer. Crosslinking agents are frequently intentionally added to HEMA based resins to impart a particular quality of crosslinking and toughness to the cured resin. However, in the practice of this invention, it is desirable to use a crosslinker in addition to that which may be inherent in the monomer. Such a crosslinker is soluble in the solvent employed in making the adhesive resin solution. In this respect, one may include the above crosslinker, in its normal impurity concentrations, as part of the crosslinker, plus one or more additional crosslinkers that contain at least two acrylyl groups bonded to aromatic containing moiety(ies). A desirable crosslinker is characterized by the following formulae:

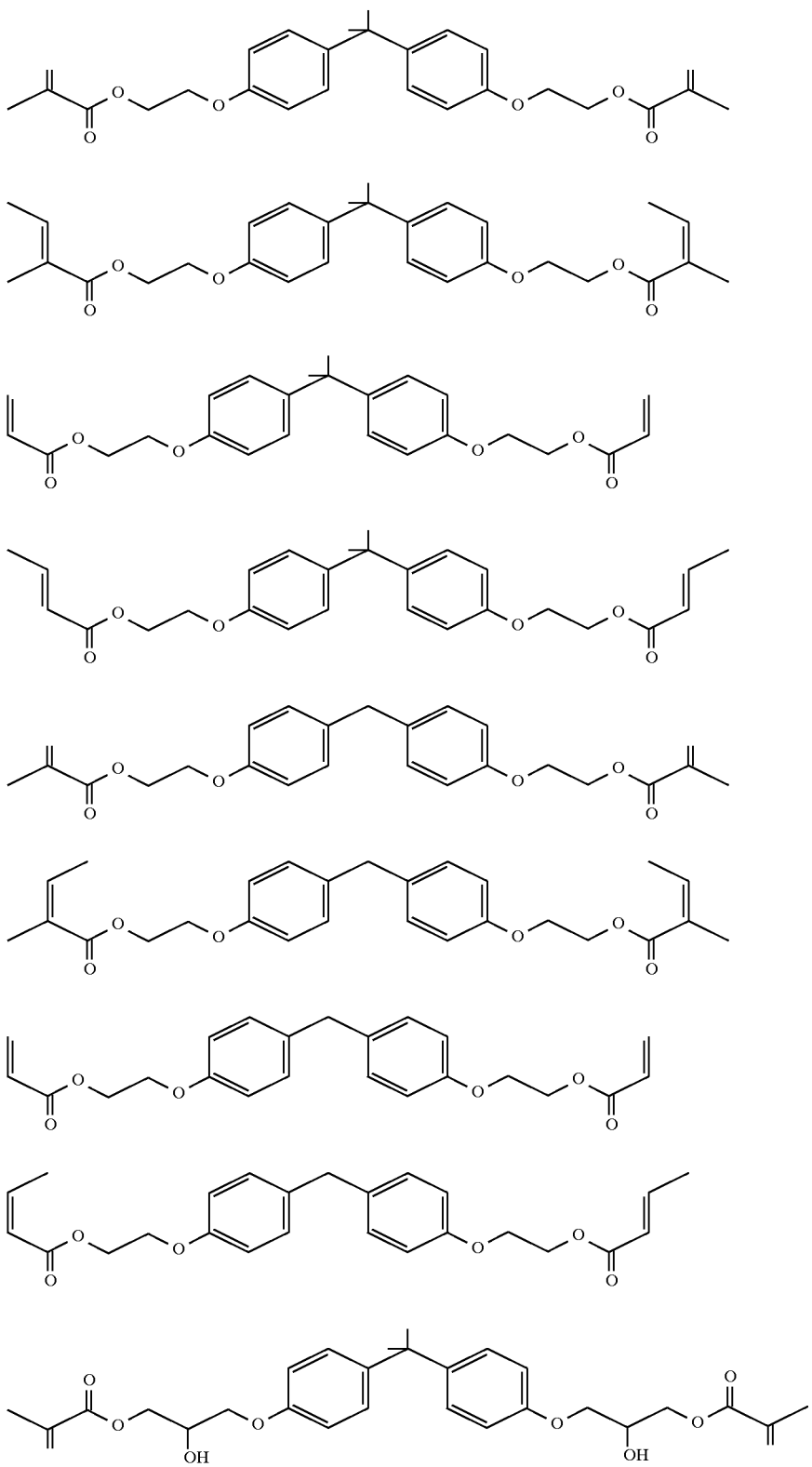

-continued

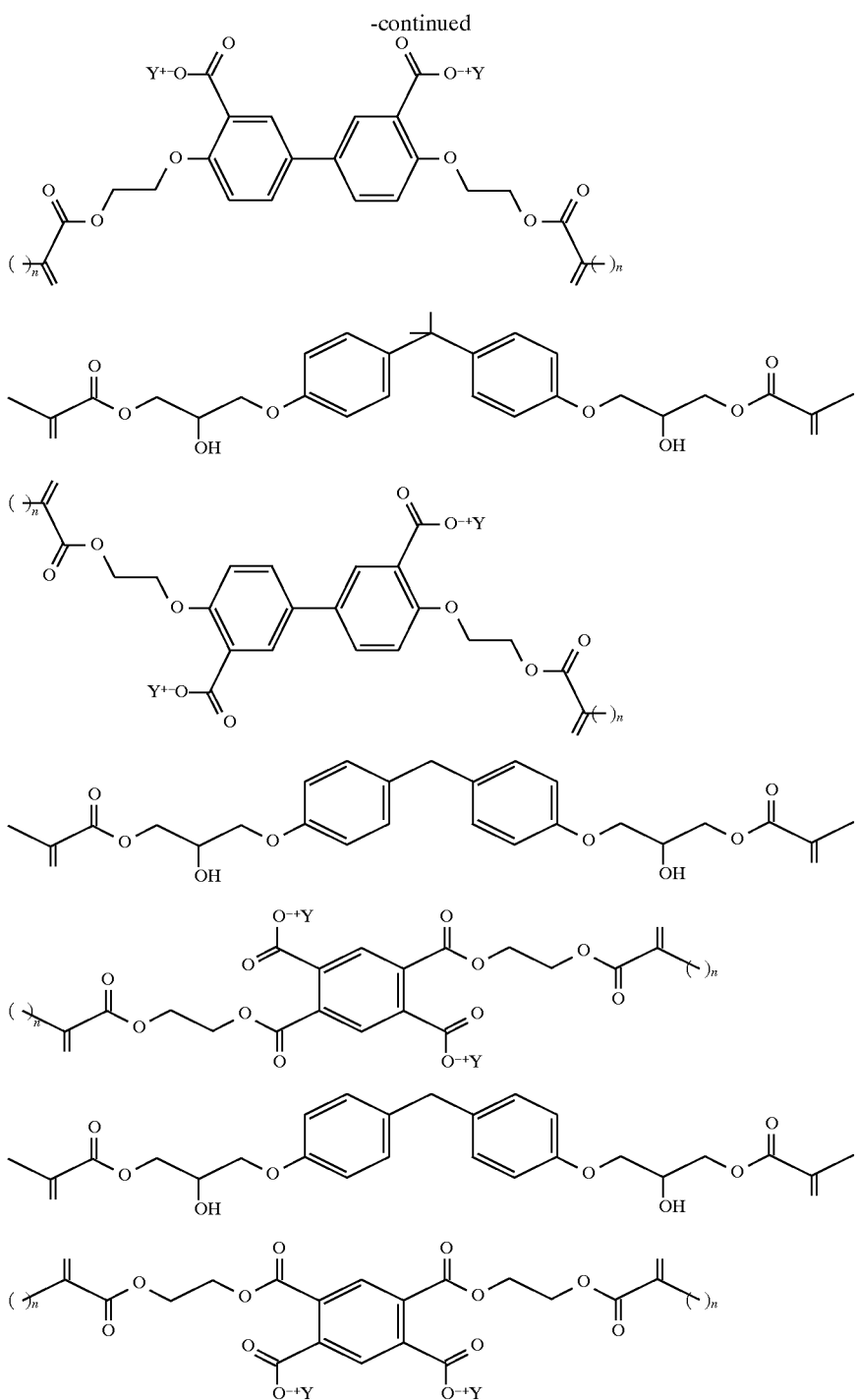

wherein Y is an alkali metal such as Li, Na, K, Rb and Cs, and n is 0 or 1.

The preferred hard crosslinking agent is one of a crosslinker (cross linking agent) such as 2,2-bis(4-methacryloxy 2-ethoxy-phenyl) propane, diethyleneglycol bismethacrylate, the alkali metal salts of 4,4'-bis(4-methacryloxy-2-ethoxy 3-carboxy)biphenyl (salt of the reaction product of 2-hydroxyethylmethacrylate and sym.-tetracarboxylic dianhydride), the alkali metal salts of the reaction product of 2-hydroxyethylmethacrylate and pyromellitic anhydride, the alkali metal salt of the reaction product of 2-hydroxyethylmethacrylate and 3,3',4,4'-benzophenonetetracarboxylic anhydride, the alkali metal salt of the reaction product of 2-hydroxyethylmethacrylate and trimellitic anhydride, and the like, in which the alkali metals are one or more of Li, Na, K, Rb and Cs. The preferred crosslinker is typically an diacrylic or dimethacrylic ester or ether of bisphenol A.

(d) Also included in the formulation is a photoinitiator. According to one aspect this invention, the light-initiated curing of a polymerizable matrix material involves photosensitization of light-sensitive compounds by ultraviolet or visible light, which, in turn, initiates polymerization of the matrix material. The photoinitiator to be used in this invention comprises a combination of a photosensitive ketone and a tertiary amine. Typical photosensitive ketones include benzophenone, acetophenone, thioxanthen-9-one, 9-fluorenone, anthraquinone, 4'-methoxyacetophenone, diethoxyacetophenone, biacetyl, 2,3-pentadione, benzyl, 4,4'-methoxybenzil, 4,4'-oxidibenzil, and 2,3-bornadione (dl camphroquinone). Typical tertiary amines include ethyl-4-dimethyl amino benzoate, ethyl-2-dimethyl amino benzoate, 4,4'-bis (dimethylamino) benzophenone, N-methyldiethanolamine, and dimethylaminobenzaldehyde. A preferred combination of the photoinitiators is 2,3-bornanedione with ethyl-2-dimethyl amino benzoate. Other suitable initiator are illustrated in U.S. Pat. No. 4,674,980 to Ibsen, et al., the disclosure of which is incorporated by reference. Alternatively, any known photosensitizing system which can function effectively in a solution composition when exposed to light may substitute for the above-named compounds or combinations. The amount of the photoinitiator should be sufficient to initiate polymerization in a selected resin and complete it in depth within about half a minute when the filler-resin composition is exposed to a visible light output of at least 5,000 foot candles. In addition, any known free-radical scavenger (anti-oxidants) such as butylated hydroxytoluene can be used to scavenge small amounts of free radicals generated during extended shelf storage.

(e) The solvent employed in making the adhesive mixture of the invention is desirably miscible in water in an amount that facilitates the dissolution of the other ingredients of the formulation. It is desirable to use a volatile solvent that is quickly removed from the tooth on exposure of a coating of the adhesive on the tooth. A less volatile solvent can be used if it does not adversely affect the adhesive interface with the tooth and any composite component to which the adhesive is bound and serves to secure to the tooth. A preferred solvent is acetone. The most preferred solvent is a mixture of acetone and water, typically in the range as set forth in Table 1 below, and most preferably in the range of 4 parts by weight acetone to 1 part by weight water. Other solvents that might be employed, alone or in combination with acetone and/or water are the hydroxyethylethers such as the monomethyl ether of ethylene glycol, and the like.

Optionally, the adhesive coating may contain pigments such as iron oxide or titanium oxide and a color stabilizing agent such as 2,2-hydroxy-5-tert. octyl phenylbenzotriazole.

In formulating the adhesive of the invention, the selection of the ingredients in formulating the coating is not narrowly critical. Illustrative of such a formulation is the composition as set forth in Table 1.

TABLE 1

| Ingredients | Percentage by Weight[1] |
|---|---|
| Ethylenically unsaturated monomer, e.g., 2-hydroxyethyl methacrylate | 5–30 |
| Crosslinker, e.g., Ethoxylated bisphenol A dimethacrylate | 2–20 |
| Coupling agent, e.g., Na NTG-GMA | 2–30 |
| Photoinitiator, e.g. | 0.02–0.6 |
| 2,3-bornanedione | 0.02–0.3 |
| Ethyl 2-dimethylaminobenzoate | 0.00–0.3 |

TABLE 1-continued

| Ingredients | Percentage by Weight[1] |
|---|---|
| Solvent, such as acetone | 30–70 |
| Deionized water | 5–20 |

[1]To 100%, i.e., no combination of components exceed 100%.

The solution is formed. The resulting solution is then coated onto the surface as needed. The coating will self-cure in about 20–30 minutes, but cures instantly on exposure to light. Light having a wave length of about 480 ηM at an intensity of about 5000 foot-candles is preferred. An exposure of about 30 second is sufficient to cure the cement in most applications.

The method of the invention may be effected by the following procedure:

(1) The first step in using the adhesive formulation of the invention involves preparing the tooth surface undergoing treatment. It is important to clean the surface to which the adhesive coating is being applied. Water washing the surface, if an acid wash is not recommended or needed, will prepare the surface provided the surface is thoroughly dry before applying the adhesive coating. If an acid wash is not desired, then apply the adhesive to the tooth portion undergoing treatment as per step (2) below. If an acid wash is desired, then contact the tooth surface with an aqueous conditioning solution comprising at least one strong acid or acidic salt in order to condition the surface.

This aqueous conditioning solution comprises (a) a strong acid or combination of acids and may include (b) one or more polyvalent cations (preferably $Al^{+++}$) which can form relatively water-insoluble precipitates with phosphate ions. The preferred polyvalent cation, when used, is the trivalent aluminum ion, at least as to dental applications where aesthetics is important. Aluminum oxalate gives excellent results. The ferric ion, while usable in some applications, can lead to staining by reduction to ferrous ion in the presence of sulfide. The ferrous sulfide can be generated by the metabolic activity of anaerobic microorganisms. However, sulfides do not form black complexes with aluminum ions under the conditions of interest.

Aluminum oxalate is soluble in water when formulated with the other ingredients of the conditioner. The solubility of aluminum oxalate in water depends upon the stoichiometry and pH. Aluminum ions can form insoluble, metastable, microporous, quasi-amorphous precipitates of phosphate surfaces. Aluminum ions can strengthen the altered substrate surface structures by crosslinking and reinforcing the collagenous component of dentin surface reacted upon by the tooth surface with conditioner or etchant aqueous solutions.

In applications where color stability and aesthetics are not deciding factors, aluminum ions, ferric ions, and other polyvalent cations can be used separately or in combinations in the conditioner/etchant step of the present invention.

The function of the incorporation of a compound with one or more carboxyl groups, such as, for example, oxalic acid or an oligocarboxylic acid as exemplified by aluminum oxalate, is believed to be the precipitation of insoluble calcium and the other complexes which also can assist in obturating the dential tubules of vital dentin, when it is treated with such a conditioner/etchant solution.

The strong acid which is also preferably present in the conditioner and/or etchant solution renders the solution low in pH value. The purposes of the low pH are (1) to dissolve the smeared (disturbed) surface layer on cut dentin, enamel, or other substrates, (2) to partially decalcify intertubular dentin, (3) to remove pellicle, plaque, or other surface contaminants from the substrate, and (4) optionally, to acid etch enamel and other substrate surfaces. Another function of the strong acid component which renders the conditioner and/or etchant solution strongly acidic (low pH) is to render soluble some or all of the other components in the solution. The preferred acid is phosphoric acid, or a mixture of phosphoric acid and nitric acid, ranging in concentration from about one-tenth percent to about 50% by weight, preferably, from about 0.1% to 10% by weight and most preferably on the order of about 2 to 5% by weight of the aqueous solution. Compounds such as $Al(NO_3)_3$ can hydrolyze in the aqueous formulation of the conditioner and/or etchant solution to provide the strong acid and necessary low pH. Such strong acids as hydrochloric acid, perchloric acid, sulfuric acid and others, and acid mixtures may or may not be effective in improving the bond strengths obtainable in the use of the present invention.

Particularly desirable etchant and conditioner solutions contain the following formulations:

| ETCHANT FORMULATION | | CONDITIONER FORMULATION | |
| --- | --- | --- | --- |
| COMPONENT | WEIGHT PERCENT | COMPONENT | WEIGHT PERCENT |
| Distilled Water | 50.62 | Distilled Water | 92.5 |
| Methyl Cellulose | 7.00 | Ortho-phosphoric acid | 2.8 |
| Ortho-phosphoric acid | 42.32 | | |
| | | Nitric acid | 1.3 |
| Red Food Coloring | 0.06 | Aluminum oxalate | 3.4 |

Coating of these formulations may be effected with a dispensable brush or a skube (a preformed Styrofoam™ sponge). A preferred etching solution comprises phosphoric acid alone. A preferred conditioner comprises a mixture of phosphoric and nitric acids plus aluminum oxalate. Leave for 15 seconds and blot dry with a skube.

(2) The next or first step, as the case may be involves coating the tooth portion undergoing treatment with the adhesive solution of the invention. Apply 2–5 coats of the adhesive solution onto the prepared bonding surface with a dispensable brush. Generally the adhesive coating in dry to touch in about 15 seconds with air drying. At this point, the composite can be affixed to the adhesive, or the adhesive can be light cured. Light activation is generally effected in about 30 seconds.

(3) Optionally, more adhesive can be coated on the substrate followed by light-activate for 30 seconds. Whether more adhesive is added, the composite is applied to the adhesive treated substrate, and the composite affixed tooth portion is subjected to light cure, and final cure of the composite-adhesive-tooth structure is effected.

Tests were run to determine bond strengths to dentin involving the adhesive formulation of the invention and a competitive product. The formulation of the adhesive of invention comprised:

| Formulation components ("FOI") | Percent by weight |
| --- | --- |
| Acetone | 55.9 |
| Processed water (deionized water) | 14. |
| Na NTG-GMA | 14. |
| High purity ethoxylated bisphenol A dimethacrylate | 8. |

-continued

| Formulation components ("FOI") | Percent by weight |
| --- | --- |
| 2-Hydroxymethacrylate | 12. |
| Camphorquinone | 0.0 |
| Ethyl 2-dimethylaminobenzoate | 0.0 |

The formulation (FOI) was made by mixing the ingredients with stirring in the order listed. This formulation was compared with a commercial adhesive sold by Bisco Inc., 1500 W. Thordal Ave., Itasca, Ill., 60143, under the tradename of "Uni-Bond", called a "one-step" adhesive bonding acrylic resin system, that uses a single solution to form the adhesive resin film. The compared adhesives were:

1. Formulation of invention (FOI) used with preferred etchant (designated "F-1E");
2. Formulation of invention (FOI) used with preferred conditioner (designated "F-2C"); and
3. Uni-Bond with manufacturer's 32% phosphoric acid etchant according to manufacturers instructions (designated "UB").

The bonding tests[2] were conducted by placing the adhesive coatings on the treated substrate, and cured by exposure to light as indicated below. A heavy body composite, Marathon™ (sold by Den-Mat, Inc.) was placed in a 5.3 mm diameter gelatin capsule which was then placed on the substrate and cured with light. The samples were placed in 37° C. $H_2O$ for 1 hour or 24 hours, as indicated below, and debonded using an Instron Universal 1011 testing machine using a cross head speed of 1 mm/min. The following results show the mean bond strengths and standard deviations in megapascals of at least 10 mpa:

[2]Bond Strength Standard Test:
Materials and Equipment:
1. Instron Tester
2. Gelatin capsules, #3
3. Five ¼-ounce polycons
4. Bovine teeth
5. Dental model trimmer
6. King Temporary Crown and Bridge Material or any other cold curing acrylic resin
7. Den-Mat designed laboratory curing light
8. Timer
9. Mixing sticks
10. Light-Cured Marathon™ A and B Paste (Den-Mat Corporation)
11. Bond strength test fixtures for Instron Tester
12. Water bath

| Application F-1E | Application F-2C | Application UB |
| --- | --- | --- |
| Apply ethant to dentin. After 15 sec., rinse with water and air dry Apply 3 coats of FOI and gently evaporate solvent with oil-free compressed air. Light cure for 30 seconds Apply composite, method step 8 of footnote 2, supra. Cure according to method steps 9–12 and test according to method steps 13–15 of footnote 2. | Apply ethant to dentin. After 30 sec., rinse with water and air dry Apply 3 coats of FOI and gently evaporate solvent with oil-free compressed air. Light cure for 30 seconds Apply composite, method step 8 of footnote 2, supra. Cure according to method steps 9–12 and test according to method steps 13–15 of footnote 2. | Apply manufacturer's 32% phosphoric acid etchant, rinse with water and dry with air. Apply two (2) consecutive coats of UB, and air dry. The second coat is what is left on the brush from the first coat. Light cure for 10 seconds. Apply another coating of UB, followed by air drying. Cure according to method steps 9–12 and test according to method steps 13–15 of footnote 2, except that the cure was for 2 minutes, carried out three times.. |

-continued

Bond Strength (psi) Data

Method:

1. Select 5 large bovine teeth.
2. Using dental model trimmer, grind each tooth to a flat, dentin surface.
3. After all 5 teeth have been ground, remove lids from 5 ¼-ounce polycons and set aside.
4. Into a small disposable beaker, weight 5-½ grams of Kind Powder (Den-Mat Corporation) and 6 grams of Kind Liquid (Den-Mat Corporation). Mix well with a plastic mixing stick and pour into previously set aside polycon lids until half full.
5. Carefully place tooth into center of polycon lid, taking care not to contaminate flat ground surface. Allow Kind to cure at least to a rubbery consistence.
6. Mix another quantity of Kind and pour into polycon lid until full, taking care again not to contaminate flat ground surface. Allow Kind to cure completely.
7. When all 5 samples have been imbedded and Kind is completely cured, apply material to be tested to ground flat surface, following instructions for that particular product.
8. Fill small diameter half of each of 5 #3 gelatin capsules with Marathon ™ mixed to a 1:1 paste A/paste B ratio. Apply to prepared tooth surface.
9. Cure each prepared sample in laboratory curing light as follows:
10. Place sample at a 30° angle to the perpendicular in center of curing chamber.
11. Turn on curing light for one minute setting timer.
12. Rotate sample 90° and expose for an additional minute.
13. Mark sample for identification and place in 37° C. water bath for one hour or 24 hours, as indicated.
14. Make sure that Instron Tester is configured for bond strength of testing.
15. After 1 hour or 24 hours, remove samples from conditioning water. Using special fixture, stress until failure on Instron at a crosshead speed of 0.02 in/min.

Calculations: bond strength $\frac{loadatfailure}{areaofsample}$ (For #3 gelatin capsules, area of sample is 0.0380 mm.) Average of three highest values is taken as the bond strength.

1 hour water bath:

| | | |
|---|---|---|
| 1391, 1739, 1097, 1513, 2107 Average of highest three samples results: 1786, with a standard deviation of 245. Average of the five sample results: 1569, with a standard of deviation of 339. | 2692, 1743, 1014, 1408, 2215 Average of highest three samples results: 2217, with a standard deviation of 387. Average of the five sample results: 1814, with a standard of deviation of 590. | 368, 589, 587, 701, 701 Average of highest three samples results: 664, with a standard of deviation of 53. Average of the five sample results: 589, with a standard deviation of 122. |

24 hours water bath

| | | |
|---|---|---|
| 2101, 1537, 1697, 1461, 1629 Average of highest three sample results: 1809, with a standard deviation of 208. Average of the five sample results: 1685, with a standard of deviation of 223. | 2687, 1466, 299, 2433, 1753 Average of highest three samples results: 2291, with a standard deviation of 394. Average of the five sample results: 1728, with a standard of deviation of 840. | 891, 373, 0, 526, 0 Average of highest three sample results: 597, with a standard of deviation of 217. Average of the five sample results: 350, with a standard of deviation of 337. |

Though this invention has been described with respect to a plurality of details, it is not intended that the invention be limited thereby except to the extent that such limitations appear in the claims. Other embodiments that are obvious variations of the embodiments herein disclosed are intended to be encompassed by this invention.

We claim:

1. A stable single package adhesive for tooth bonding application that can be stored in and used from a single container comprising a stable solution consisting essentially of a homogeneous mixture of the following components:

a) an ethylenically unsaturated functional and hygroscopically functional monomer chosen from the group consisting of N-vinyl-2-pyrrolidone, vinyl acetate, vinyl methyl ether, glycidyl (meth)acrylate, N-(meth)acryl-2-imidazolidone, and acrylic monomers having the following structure:

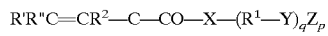

$$R'R''C=CR^2-C-CO-X-(R^1-Y)_qZ_p$$

wherein R' and R", individually, are hydrogen, an alkyl of 1 to about 4 carbon atoms, monocyclic aryl or a cycloalkyl; $R^2$ is hydrogen or an alkyl of 1 to about 3 carbon atoms; X is O, S or N—$R^3$ wherein $R^3$ is hydrogen, an alkyl of 1 to about 4 carbon atoms, or —$R^1$—Y; $R^1$ is a divalent radical connecting Y to X; Y is OH, $NR^5$, SH, $OR^6$, wherein $R^5$ is hydrogen, methylol, or methylol methyl ether, and $R^6$ is an alkyl of 1 to about 3 carbon atoms; q is 0 or 1 and p is 0 or 1, provided that p is 0 when q is 1 and p is 1 when q is 0; and Z is hydrogen;

b) an ethylenically unsaturated functional and hygroscopically functional coupling agent that is capable of (i) chemically reacting with and through the ethylenic bond of the ethylenically unsaturated-functional monomer of a) and (ii) chemically bonding to the surface to which the adhesive is applied, wherein said coupling agent is chosen from the group consisting of aromatic substituted amino acid alkali metal salts and alkali metal salts of carboxylic acids containing at least one amino group;

c) a poly-ethylenically unsaturated functional crosslinking agent that is capable of reacting with the monomer of a) above;

d) a photoinitiator that induces addition polymerization of ethylenically unsaturated compounds; and e) an aqueous containing organic solvent present in the amount of 35 to 90 weight percent based on the weight of the stable solution.

2. The stable single package adhesive of claim 1 wherein a) contains ethylenic unsaturation such that it coreacts by addition polymerization with b) and c) and a hygroscopic group that contributes to the properties of the adhesive.

3. The stable single package adhesive of claim 1 wherein the coupling agent is a monomer that possesses acrylic unsaturation and contains a surface bonding group.

4. The stable single package adhesive of claim 3 where in the surface bonding group is at another part of the coupling agent molecule than the acrylic unsaturation and imparts one or more of the following properties to the adhesive coating:

I chemical bonding capabilities to the substrate surface to which the adhesive coating is applied; and II wetting agent properties in that it reduces the surface tension of the adhesive coating, causing the coating to spread across or penetrate more easily the substrate surface onto which the adhesive is applied.

5. The stable single package adhesive of claim 4 wherein the coupling agent is an acrylic monomer that possesses acrylic unsaturation and contains a surface bonding group selected from the group of:

| | |
|---|---|
| i) an alkylene polyether; | vi) phosphinyl; |
| ii) hydroxyl; | vii) stannoyl; |
| iii) carboxylic acid salt; | viii) amide; |
| iv) quaternary ammonium; | ix) alkylene amine; |
| v) tertiary amine; | x) alkoxysily; and |
| vi) phosphoryl; | xi) acyloxysilyl. |

6. The stable single package adhesive of claim 1 wherein the solvent comprises acetone.

7. The stable single package adhesive of claim 1 wherein the crosslinking agent contains at least two unsaturated groups bonded via aliphatic groups, each of up to 10 carbon atoms, to a central organic moiety that is aromatic, in that it comprises a group that has the rigidity characteristics of a benzene ring.

8. The stable single package adhesive of claim 7 wherein the crosslinking agent contains carboxylic acid alkali metal salt groups directly bonded to a carbon atom of the central organic moiety that is aromatic.

9. The stable single package adhesive of claim 8 wherein the alkali metal is selected from the group consisting of Li, Na, K, Rb and Cs.

10. The stable single package adhesive of claim 1 wherein the crosslinking agent contains at least two unsaturated groups bonded to a central moiety that is aliphatic in nature in that it comprises a group that has the flexibility of an alkane or an alkyl benzene containing compound.

11. The stable single package adhesive of claim 10 wherein the functional groups of the crosslinking agent are selected from the group consisting of ethylene glycol, diethylene glycol, 2,2-bis (43-hydroxyphenyl) propane, and 2,2,-bis(4-hydroxyphenyl) fluoroalkanes.

12. The single package adhesive of claim 1 wherein the homogeneous mixture consists essentially of the following ingredients in the following percentages by weight:
  (a) 5 to 30 percent 2-hydroxyethyl methacrylate;
  (b) 2 to 30 percent sodium NTG-GMA;
  (c) 2 to 20 percent ethoxylated bisphenol A dimethacrylate;
  (d) 0.03 to 0.6 percent photoinitiator;
  (e) 30 to 70 percent acetone; and
  (f) 5 to 20 percent water.

13. A homogeneous liquid stable single-package system that can be stored in and used from a single container comprising a stable solution consisting essentially of a homogeneous mixture of the following components:
  a) an ethylenically unsaturated functional monomer selected from the group consisting of 2-hydroxyethyl-methacrylate and 2,3-dihydoxypropyl-methacrylate;
  b) a coupling agent selected from the group consisting of an alkali metal salt of (i) N-phenylgylcine, (ii) the adduct of N-(p-tolyl)glycine and glycidyl-methacrylate, and (iii) the adduct f N-phenylgylcine and glycidyl methacrylate;
  c) a crosslinker selected from the group consisting of 2,2-bis(4-methacryloxy 2-ethoxyphenyl) propane, diethyleneglycol bismethacrylate, the alkali metal salt of 4,4'-bis (4-methacryloxy-2-ethoxy 3-carboxy) biphenyl, the alkali metal salts of the reaction product of 2-hydroxyethylmethacrylate and pyromellitic anhydride, the alkali metal salt of the reaction product of 2-hydroxyethyl-methacrylate and pyromellitic anhydride, the alkali metal salt of the reaction product of 2-hydroxyethylmethacrylate and 3,3' 4,4,'-bensophenonetetracarboxylic anhydride, and the alkali metal salt of the reaction product of 2-hydroxyethylmethacrylate and trimellitic anhydride, in which the alkali metals utilized to make the crosslinker are one or more members selected from the group consisting of Li, Na, K, Rb and Cs;
  d) a photoinitiator;
  e) a water soluble organic solvent present in the amount of 30 to 70 weight percent based on the weight of the stable homogeneous mixture; and
  f) water present in the amount of 5 to 20 weight percent based on the weight of the stable homogeneous mixture.

14. A stable single-package solution that can be stored in and used from a single container comprising a homogeneous mixture consisting essentially of;
  a) 2-Hydroxyethylmethacrylate
  b) the alkali metal salt of the adduct of N-(p-tolyl) glycine and glycidyl methacrylate;
  c) ethoxylated bisphenol A dimethacrylate;
  d) a photoinitiator; and
  e) acetone-water solvent mixture present in the amount of 35 to 75 weight percent based on the weight of the stable homogeneous mixture.

* * * * *

UNITED STATES PATENT AND TRADEMARK OFFICE
CERTIFICATE OF CORRECTION

PATENT NO. : 5,847,020
DATED : December 8, 1998
INVENTOR(S) : Ibsen et al.

It is certified that error appears in the above-indentified patent and that said Letters Patent is hereby corrected as shown below:

Claim 1, line 12, before "-CO-", please delete "-C-".

Signed and Sealed this

Eighth Day of June, 1999

Attest:

Q. TODD DICKINSON

*Attesting Officer*  *Acting Commissioner of Patents and Trademarks*